United States Patent [19]

Kawakami et al.

[11] Patent Number: 4,773,740
[45] Date of Patent: Sep. 27, 1988

[54] ELECTROCHROMIC DISPLAY DEVICE

[75] Inventors: Akira Kawakami; Toshikatsu Manabe; Tsunemi Ohiwa; Shuichi Wada; Kenichi Yokoyama, all of Osaka; Saburo Nonogaki, Tokyo; Kazusuke Yamanaka, Kanagawa, all of Japan

[73] Assignee: Hitachi Maxell, Ltd., Osaka, Japan

[21] Appl. No.: 110,884

[22] Filed: Oct. 21, 1987

[30] Foreign Application Priority Data

Oct. 25, 1986 [JP] Japan ................................. 61-254166
Oct. 25, 1986 [JP] Japan ................................. 61-254167

[51] Int. Cl.⁴ ............................................... G02F 1/01
[52] U.S. Cl. .................................................... 350/357
[58] Field of Search ........................ 350/357, 355, 353; 340/785

[56] References Cited

U.S. PATENT DOCUMENTS 4,249,013 2/1981 Haddon et al. ................. 350/357 X
4,399,436 8/1983 Hamada et al. ..................... 350/357

Primary Examiner—Eugene R. Laroche
Assistant Examiner—Nathan W. McCutcheon
Attorney, Agent, or Firm—Birch, Stewart, Kolasch & Birch

[57] ABSTRACT

An electrochromic display device which comprises a display electrode comprising a transparent substrate, a transparent electrode formed on an inner surface of the transparent substrate and an electrochromic material layer for display made of tungsten oxide and formed on the transparent electrode; a counter electrode comprising a substrate, a conductive layer formed on an inner surface of the substrate and an activated carbon fiber material; and a spacer provided between the display electrode and the counter electrode with their inner surfaces facing each other to define, between them, an electrolyte chamber, which is filled with an electrolyte comprising a lithium salt and at least one of the tertiary alkyl ammonium salts and quarternary alkyl ammonium slats dissolved in a non-aqueous medium containing a small amount of water, which device has increased original injected charge which can last for a long time.

7 Claims, 1 Drawing Sheet

Figure
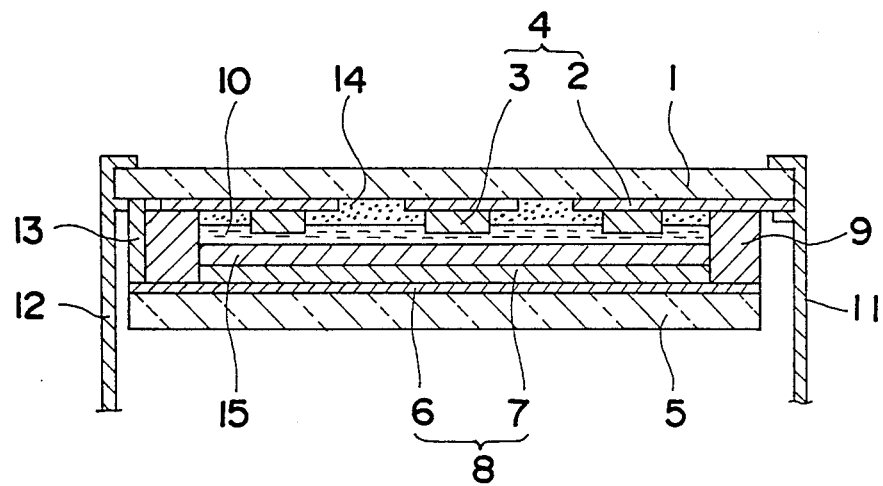

ELECTROCHROMIC DISPLAY DEVICE

BACKGROUND OF THE INVENTION

1. Field of the Invention

This invention relates to an electrochromic display device. More particularly, it relates to an electrochromic display device which utilizes color change of an electrochromic compound caused by its reaction with a counter electrode material through an electrolyte.

2. Description of the Prior Arts

A typical electrochromic display device comprises a display electrode comprising a transparent substrate, a transparent electrode formed on an inner surface of the transparent substrate and an electrochromic material layer for display formed on the transparent electrode: a counter electrode comprising a substrate, a conductive layer formed on an inner surface of the substrate and a counter electrode material; and a spacer provided between the display electrode and the counter electrode with their inner surfaces facing each other to define, between them, an electrolyte chamber which is filled with an electrolyte.

Such electrochromic display device utilizes coloring of the electrochromic material by applying voltage between the the display electrode and the counter electrode through the electrolyte.

Generally, tungsten oxide ($WO_3$) is used as an electrochromic material, and a lithium salt is used as an electrolyte. In such combination of the electrochromic material and the electrolyte, tungsten oxide turns blue according to the following reaction:

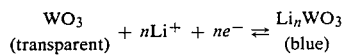

$$\underset{\text{(transparent)}}{WO_3} + nLi^+ + ne^- \rightleftharpoons \underset{\text{(blue)}}{Li_nWO_3}$$

In order to increase an amount of injected charge so as to improve response characteristics of the electrochromic display device comprising tungsten oxide as an electrochromic material and a solution of a lithium salt in a non-aqueous solution as an electrolyte, water is added to the electrolyte, and an activated carbon material such as activated carbon fiber is used as a counter electrode material. Water is dissociated to liberate $H^+$, which acts in the same manner as $Li^+$ in the electrode Although the increase of the amount of water in the electrolyte achieves the desired response characteristics of the electrochromic display device which utilizes the activated carbon material as the counter electrode, injected charge gradually decreases during storage to a greater extent and it is difficult to maintain stably the original response characteristics for a long time.

SUMMARY OF THE INVENTION

An object of the present invention is to provide an electrochromic display device which has large injected charge and maintains such large injected charge for a long time.

Another object of the present invention is to provide an electrochromic display device having improved original response characteristics which do not deteriorate for a long time.

Further object of the present invention is to provide an electrochromic display device which has improved storage stability.

Accordingly, an electrochromic display device of the present invention comprises a display electrode comprising a transparent substrate, a transparent electrode formed on an inner surface of the transparent substrate and an electrochromic material layer for display made of tungsten oxide and formed on the transparent electrode: a counter electrode comprising a substrate, a conductive layer formed on an inner surface of the substrate and an activated carbon fiber material: and a spacer provided between the display electrode and the counter electrode with their inner surfaces facing each other to define, between them, an electrolyte chamber, which is filled with an electrolyte oomprising a lithium salt and at least one of tertiary alkyl ammonium salts and quarternary alkyl ammonium salts dissolved in a non-aqueous medium containing a small amount of water.

BRIEF DESCRIPTION OF THE DRAWING

FIGURE is a cross section of an electrochromic display device according to the present invention.

DETAILED DESCRIPTION OF THE INVENTION

According to the present invention, the electrolyte contains the tertiary alkyl ammonium salt and/or the quarternary alkyl ammonium salt as an electrolyte material in addition to the lithium salt in the non-aqueous medium containing a small amount of water. Thereby, not only the original injected charge is increased, but also such large original injected charge is maintained stably for a long time. The reason for such effects has not been clearly known, and may be supposed as follows:

In a conventional electrochromic display device which uses an electrolyte comprising the non-aqueous medium containing the lithium salt and water, an anion (e.g. $ClO_4^-$ in case of $LiClO_4$) and $H^{30}$ which is liberated from water may be easily absorbed by the activated carbon material which is used as the counter electrode, and said absorption gradually proceeds during storage of the electrochromic display device. As the result, on one hand, a concentration of $OH^-$ increases and, on the other hand, turn a concentration of $H^+$ decreases. If the concentration of $H^+$ decreases in the electrolyte, tungsten oxide tends to be easily dissolved in the electrolyte or to be converted to a material which does not act as electrochromic material such as $Li_2WO_4$. By these causes and also the decrease of $H^+$ concentration, the injected charge greatly decreases during storage of the electrochromic display device.

When the tertiary alkyl ammonium salt is co-used with the lithium salt, since a tertiary ammonium ion (e.g. $(C_2H_5)_3NH^+$), which is larger than the $H^+$ ion, is liberated and selectively absorbed by the activated carbon material so that the absorption of the $H^+$ ion by the activated carbon material is prevented. As the result, the decrease of the $H^+$ concentration in the electrolyte and in turn the significant decrease of the injected charge are suppressed. The same results can be achieved by the use of quaternary ammonium ion.

The prevention of decrease of $H^+$ concentration in the electrolyte by the use of tertiary or quarternary alkyl ammonium compound may be easily presumed from following experiments:

In each 100 ml of solutions of seven kinds of electrolytes in pure water (Solutions A to G), an activated carbon fiber cloth having an area of 300 $cm^2$ (Trade name "CH-20 by Kurare) was dipped and pH of the solution was measured periodically. The kinds of the electrolytes were as follows:

Solution A: 0.1 mole of $LiClO_4$
Solution B: 0.1 mole of $LiClO_4$ and 0.1 mole of $(C_2H_5)_3NHClO_4$
Solution C: 0.03 mole of $(C_3H_7)_3NHClO_4$
Solution D: 0.1 mole of $(C_2H_5)_3NHClO_4$
Solution E: 0.1 mole of $LiClO_4$ and 0.1 mole of $(C_2H_5)_4NClO_4$
Solution F: 0.03 mole of $(C_3H_7)_4NClO_4$
Solution G: 0.1 mole of $(C_2H_5)_4NClO_4$ The results are shown in Table 1.

TABLE 1

| Solution No. | pH of solution | | |
|---|---|---|---|
| | Original | After 1 day | After 4 days |
| A | 6.5 | 9.0 | 9.5 |
| B | 5.3 | 6.5 | 6.8 |
| C | 5.8 | 5.8 | 5.8 |
| D | 6.2 | 6.0 | 6.2 |
| E | 5.5 | 7.0 | 7.0 |
| F | 5.5 | 4.5 | 4.5 |
| G | 5.2 | 6.5 | 6.5 |

As is apparent from the results of Table 1, when the solution contains the lithium salt alone (Solution A), pH increases greatly as time passes, namely the $H^+$ concentration decreases greatly, while when the solution contains the tertiary or quarternary alkyl ammonium compound (Solutions B to G), the increase of pH is prevented. From these results, it can be supposed that the same phenomena would occur in the electrolyte comprising the non-aqueous medium and water.

In addition to the above effects of the addition of the tertiary or quarternary alkyl ammonium compound to the electrolyte, namely suppression of the decrease of $H^+$ concentration and maintenance of the large original injected charge for a long time, the present invention can reduce the amount of water to be added to the electrolyte. When the tertiary or quarternary alkyl ammonium compound is used, the original charge can be increased even if the water to be added to the electrolyte is decreased. The decrease of the amount of water additionally contributes to the storage stability of the electrochromic display device.

Although any detailed mechanism for the above has not been revealed, the reason why the original injected charge is increased even in case of a smaller amount of water in the electrolyte is assumed that the absorption of the $H^+$ ion is suppressed by the presence of the tertiary or quarternary so that the dissociation action of water is effectively utilized in the reaction of the electrochromic material and the counter electrode through the electrolyte, and that the tertiary or quarternary ammonium compound has good electrically conducting properties. As understood from the above description, one of the characteristics of the present invention resides in the co-use of the lithium salt and the tertiary or quarternary alkyl ammonium compound in the electrolyte. Although the sole use of the tertiary or quarternary alkyl ammonium compound in the electrolyte is preferred in view of the storage stability of the electrochromic display device as understood from the results for Solutions C, D, F and G in Table 1, it cannot increase the original injected charge satisfactorily.

The present invention achieves synergistic effects of the lithium salt and the tertiary or quarternary alkyl ammonium compound such that the original injected charge can be made larger than the sole use of not only the lithium salt but also the tertiary or quarternary alkyl ammonium compound.

The injected charge is maximum when the amount of the lithium salt is 50 to 70% by mole based on the total moles of the lithium salt and the tertiary or quarternary alkyl ammonium compound. As the amount of the lithium salt increases over 70% by mole, the injected charge gradually decreases. However, in the range of 30 to 90% by mole of the lithium salt, the injected charge is still larger than the sole use of the lithium salt.

As the lithium salt, any of conventionally used salts may be used. Specific examples of the lithium salt are $LiClO_4$, $LiBF_4$ and $LiPF_6$. Among them, $LiClO_4$ is preferred.

Specific examples of the tertiary alkyl ammonium compound are tertiary $C_{1-C4}$ alkyl ammonium compounds, preferably such as $(CH_3)_3NHClO_4$, $(C_2H_5)_3NHClO_4$ and $(C_3H_7)_3NHClO_4$.

Specific examples of the quarternary alkyl ammonium compound are quarternary $C_{1-C4}$ alkyl ammonium compounds, preferably $(C_2H_5)_4NClO_4$ and $(C_3H_7)_4NClO_4$.

When the tertiary or quarternary alkyl ammonium compound contains more than 4 carbon atoms in the alkyl group, it is chemically unstable and not preferred.

The non-aqueous medium in which the electrolyte materials are dissolved may be any of non-aqueous mediums which are used in the conventional electrochromic display device. Specific examples of the non-aqueous medium are propylene carbonate, acetonitrile, γ-butyrol actone, dimethoxyethane, and the like.

The electrolyte is prepared by dissolving the lithium salt and the tertiary or quarternary alkyl ammonium compound in the non-aqueous medium and then adding a small amount of water to the resulting electrolyte.

The total amount of the lithium salt and the tertiary or quarternary alkyl ammonium compound is from 0.3 to 1.5 mole, preferably from 0.5 to 1.0 mole per liter of the non-aqueous medium. The ratio of the lithium salt to and the tertiary or quarternary alkyl ammonium compound depends on the amount of original injected charge and the storage stability of the electrochromic display device. Usually, the lithium salt constitutes 30 to 90% by mole, preferably 40 to 80% by mole, most preferably 50 to 70% by mole of the total moles of the lithium salt and the tertiary or quarternary alkyl ammonium compound.

The amount of the water to be added to the electrolyte also depends on the amount of original injected charge and the storage stability of the electrochromic display device, but may be smaller than the amount of water contained in the electrolyte of the conventional electrochromic display device. Usually, water is added in an amount of 1% by weight or less, preferably 0.5% by weight, more preferably 0.2% by weight based on the weight of the non-aqueous medium.

The structure of the electrochromic display device of the present invention may be the same as that of the conventional one. The electrochromic display device of the present invention will be illustrated by making reference to the drawing which shows the cross section of the electrochromic display device.

In FIGURE, a substrate 1 is made of a transparent material such as glass, and a display electrode 4 having a pattern comprises a transparent electrode 2 made of an indium-tin oxide (ITO) or $SnO_2$ thin film of 1,000 to 3,000 Å in thickness formed on the transparent substrate 1 by vacuum deposition, spattering, ion plating and the like, and an electrochromic material layer 3 made of a tungsten oxide film of 3,000 to 10,000 Å in thickness, which can be formed on the transparent electrode by the same method as used for the formation of the transparent electrode.

On an inner surface of a substrate 5 which may be transparent or opaque, a conductive layer 6 made of an electrically conductive material such as noble metal (e.g. gold and platinum), its alloy or the same material as the transparent electrode 2 is provided by the same method as used for forming the transparent electrode 2 or contact bonding or adhesion of a metal foil. The thickness of the conductive layer 6 is usually from 1,000 to 5,000 Å. On the conductive layer 6, an activated carbon fiber cloth having a thickness of 100 to 500 μm is fixed with an electrically conductive adhesive comprising a binder and electrically conductive particles such as carbon so as to constitute a counter electrode 8. The activated carbon fiber cloth may be replaced with any form of activated carbon material.

The display electrode 4 and the counter electrode 8 are separated by a spacer 9 made of glass or a synthetic resin. An electrolyte chamber is defined by said spacer 9 and both electrodes 4 and 8 and filled with an electrolyte 10 having a specific composition according to the present invention.

Leads 11 and 12 are connected to edges of the substrate 1, respectively. A conductive coating 13 is provided for electrically connecting the lead 12 and the conductive layer 6. The conductive layer 13 may be formed by silver past or metal foil. Further, an insulating layer 14 which may comprise $SiO_2$ is provided to protect the transparent electrode 2.

A reflector 15 is provided between the display electrode 4 and the counter electrode 8 to conceal the counter electrode 8 so that its own color is used as a background of the display. For example, a sheet made of a mixture of a pigment such as titanium oxide and polytetrafluoroethylene powder is adhered to a surface of the counter electrode 8, or a gel of the pigment and the electrolyte is coated on the surface of the counter electrode 8 by screen process printing.

As understood from the above construction of the electrochromic display device of the present invention, when a voltage is applied between the display electrode 4 and the counter electrode 8, the electrochromic layer turns blue, whereby a desired pattern appears.

The present invention will be illustrated more in detail by following examples.

EXAMPLE 1

A display electrode was prepared as follows:

On one side of a transparent substrate made of a glass plate of 50 mm in width, 160 mm in length and 1.1 mm in thickness, a display electrode with a suitable pattern and an electrochromic material layer were formed by vacuum deposition, respectively. The displaying electrode was made of ITO having a thickness of 2,500 Å. The electrochromic material layer consisted of six 8-figured patterns. Each pattern consisted of 7 segments and was made of a tungsten oxide film having a thickness of 5,000 Å. Further, the exposed surface area of the substrate and the display electrodes exposed were covered with a protective layer made of $SiO_2$ having a thickness of 5,000 Å.

A counter electrode was prepared as follows:

On a whole area of one surface of a counter electrode substrate made of a glass plate of 45 mm in width, 160 mm in length and 1.1 mm in thickness, a counter electrode made of ITO having a thickness of 2,500 Å was formed by vacuum deposition. On the ITO layer, a carbon resin ink comprising a paste containing a phenolnovolak type epoxy resin and carbon black (trade name "PR-10" of Tokuriki) was screen printed to a thickness of 100 μm. Then, an activated carbon fiber cloth (trade name "CH 20" of Kurare) was fixed with the carbon resin ink and thermally cured at 180° C. for 2 hours to form a counter electrode.

Both substrate plates were bonded and sealed by an epoxy adhesive with the display electrode and the counter electrode facing each other and with inserting therebetween a reflector and placing a spacer on the peripheral portion of the substrate. The reflector consisted of a 0.3 mm thick sheet material made of a mixture of a titanium oxide pigment and polytetrafluoroethylene powder (trade name "POREFLON" of Sumitomo Electric Industries, Ltd.), and the spacer had an annular form and a thickness of 1.0 mm and consisted of polyester resin. In a space between the substrates, enclosed was about 6 ml of an electrolyte prepared by dissolving, in propylene carbonate, $LiClO_4$ in a concentration of 0.7 mole/l and $(C_2H_5)_3NHClO_4$ in a concentration of 0.3 mole/l and adding 0.1% by weight of water. Finally, leads were attached and a conductive layer was formed by coating a silver paste to form an electrochromic display device having a structure as shown in FIGURE.

EXAMPLE 2

In the same manner as in Example 1 but adding water in an amount of 1% by weight, an electrochromic display device was prepared.

EXAMPLE 3

In the same manner as in Example 1 but using, as an electrolyte, a solution of 0.5 mole/l of $LiClO_4$ and 0.5 mole/l of $(C_3H_7)_3NHClO_4$ in propylene carbonate containing 0.1% by weight, an electrochromic display device was prepared.

EXAMPLE 4

In the same manner as in Example 3 but adding water in an amount of 1% by weight, an electrochromic display device was prepared.

EXAMPLE 5

In the same manner as in Example 1 but using, as an electrolyte, a solution of 0.7 mole/l of $LiClO_4$ and 0.3 mole/l of $(C_2H_5)_4NClO_4$ in propylene carbonate containing 0.1% by weight water, an electrochromic display device was prepared.

EXAMPLE 6

In the same manner as in Example 5 but adding water in an amount of 1% by weight, an electrochromic display device was prepared.

EXAMPLE 7

In the same manner as in Example 1 but using, as an electrolyte, a solution of 0.5 mole/l of $LiClO_4$ and 0.5 mole/l of $(C_3H_7)_4NClO_4$ in propylene carbonate containing 0.1% by weight of water, an electrochromic display device was prepared.

EXAMPLE 8

In the same manner as in Example 7 but adding water in an amount of 1% by weight, an electrochromic display device was prepared.

COMPARATIVE EXAMPLE 1

In the same manner as in Example 1 but using, as an electrolyte, a solution of 1.0 mole/l of $LiClO_4$ in propylene carbonate containing 0.1% by weight, an electrochromic display device was prepared.

COMPARATIVE EXAMPLE 2

In the same manner as in Comparative Example 1 but adding water in an amount of 1% by weight, an electrochromic display device was prepared.

To compare the performance of the electrochromic display devices produced in Examples and Comparative Examples, flown electrical quantity, namely the injected charge was measured by applying rectangular wave AC voltage ($\pm 1.2$ V, 0.6 sec.) between the display electrode and the counter electrode. Then each element was kept in a thermostatic chamber kept at 45° C. for 5, 10 or 20 days. Thereafter, the injected charge was again measured in the same manner as above. From the original injected charge and that after 5, 10 or 20 day storage at 45° C., a maintenance rate of injected charge was calculated. The results are shown in Table 2.

TABLE 2

| Example No. | Original injected charge ($mc/cm^2$) | Maintenance rate of injected charge (%) after | | |
|---|---|---|---|---|
| | | 5 days | 10 days | 20 days |
| 1 | 9.3 | 98 | 95 | 93 |
| 2 | 12.0 | 95 | 88 | 86 |
| 3 | 9.0 | 98 | 94 | 92 |
| 4 | 11.0 | 95 | 90 | 88 |
| 5 | 9.5 | 98 | 95 | 92 |
| 6 | 11.0 | 96 | 88 | 85 |
| 7 | 9.0 | 98 | 94 | 92 |
| 8 | 10.5 | 95 | 90 | 88 |
| Comp. 1 | 6.0 | 95 | 92 | 90 |
| Comp. 2 | 11.0 | 93 | 80 | 75 |

What is claimed is:

1. An electrochromic display device which comprises:
   a display electrode comprising,
      a transparent electrode formed on an inner surface of the transparent substrate, and
      an electrochromic material layer for display made of tungsten oxide and formed on the transparent electrode; and
   a counter electrode comprising,
      a substrate,
      a conductive layer formed on an inner surface of the substrate, and
      an activated carbon fiber material; and
   a spacer provided between the display electrode and the counter electrode with their inner surfaces facing each other to define, between them, an electrolyte chamber, which is filled with an electrolyte comprising a lithium salt and at least one of tertiary alkyl ammonium salts and quarternary alkyl ammonium salts dissolved in a non-aqueous medium containing a small amount of water.

2. The electrochromic display device according to claim 1, wherein the lithium salt is one selected from the group consisting of $LiClO_4$, $LiBF_4$ and $LiPF_6$.

3. The electrochromic display device according to claim 2, wherein the lithium salt is $LiClO_4$.

4. The electrochromic display device according to claim 1, wherein the alkyl ammonium salt is at least one selected from the group consisting of $(CH_3)_3NHClO_4$, $(C_2H_5)_3NHClO_4$, $(C_3H_7)_3(C_3H_7)_4NClO_4$.

5. The electrochromic display device according to claim 1, wherein the total amount of the lithium salt and the tertiary or quarternary alkyl ammonium compound is 0.3 to 1.5 moles per liter of the non-aqueous medium.

6. The electrochromic display device according to claim 1, wherein the amount of the lithium salt is 30 to 90% by mole based on the total amount of the lithium salt and the tertiary or quarternary alkyl ammonium compound.

7. The electrochromic display device according to claim 1, wherein the amount of water is 1% by weight or less based on the weight of the non-aqueous medium.

* * * * *